US010919047B2

(12) United States Patent
Mainelis et al.

(10) Patent No.: US 10,919,047 B2
(45) Date of Patent: Feb. 16, 2021

(54) PERSONAL ELECTROSTATIC BIOAEROSOL SAMPLER WITH HIGH SAMPLING FLOW RATE

(71) Applicant: Rutgers, The State University of New Jersey, New Brunswick, NJ (US)

(72) Inventors: Gediminas Mainelis, North Brunswick, NJ (US); Taewon Han, Monmouth Junction, NJ (US)

(73) Assignee: RUTGERS, THE STATE UNIVERSITY OF NEW JERSEY, New Brunswick, NJ (US)

( * ) Notice: Subject to any disclaimer, the term of this patent is extended or adjusted under 35 U.S.C. 154(b) by 299 days.

(21) Appl. No.: 15/757,722

(22) PCT Filed: Sep. 8, 2016

(86) PCT No.: PCT/US2016/050635

§ 371 (c)(1),
(2) Date: Mar. 6, 2018

(87) PCT Pub. No.: WO2017/044536

PCT Pub. Date: Mar. 16, 2017

(65) Prior Publication Data

US 2019/0039076 A1 Feb. 7, 2019

Related U.S. Application Data

(60) Provisional application No. 62/215,345, filed on Sep. 8, 2015.

(51) Int. Cl.
*B03C 3/32* (2006.01)
*B03C 3/41* (2006.01)
(Continued)

(52) U.S. Cl.
CPC ................ *B03C 3/32* (2013.01); *B03C 3/363* (2013.01); *B03C 3/368* (2013.01); *B03C 3/41* (2013.01);
(Continued)

(58) Field of Classification Search
CPC ......... G01N 2001/2223; G01N 1/2202; G01N 1/2205; G01N 1/2208; G01N 2001/2276; B03C 3/368; B03C 3/62
(Continued)

(56) References Cited

U.S. PATENT DOCUMENTS 3,827,217 A * 8/1974 Volsy ........................ B03C 3/36 96/51
3,915,387 A 10/1975 Caruel et al.
(Continued)

FOREIGN PATENT DOCUMENTS

JP 2011106423 A 6/2011

*Primary Examiner* — Tran M. Tran
(74) *Attorney, Agent, or Firm* — Fox Rothschild LLP

(57) ABSTRACT

A personal electrostatic bioaerosol sampler (PEBS) for collecting bioaerosols (from virus to pollen) at high sampling flow rates and for measuring personal exposures to bioaerosols in various occupational environments, particularly at their low concentrations and for extended periods of time, and a method of using same, are disclosed. The PEBS includes a base holder, a charging section, and a collection section. Charging section includes a first member inside a center of charging section configured to be connected to positive or negative high voltage and a second member disposed therearound a midpoint of first member inside charging section configured to be grounded such that a plurality of ions are produced for charging a plurality of incoming particles. A collection plate is releasably secured inside collection section such that when collection section is grounded and negative or positive high voltage is connected to collection plate, a plurality of charged incoming particles
(Continued)

are deposited onto collection plate by an electrostatic field. A middle section of base holder is configured to partly receive charging section and collection section via an opening therethrough such that charging section is secured to a first side of base holder and collection section is secured to a second side of base holder when sampler is in an assembled configuration.

17 Claims, 12 Drawing Sheets

(51) Int. Cl.
*B03C 3/82* (2006.01)
*G01N 1/22* (2006.01)
*B03C 3/47* (2006.01)
*B03C 3/36* (2006.01)

(52) U.S. Cl.
CPC .................. *B03C 3/47* (2013.01); *B03C 3/82* (2013.01); *G01N 1/2202* (2013.01); *G01N 1/2273* (2013.01); *B03C 2201/04* (2013.01); *B03C 2201/24* (2013.01); *G01N 2001/2223* (2013.01); *G01N 2001/2276* (2013.01)

(58) Field of Classification Search
USPC .......................................... 73/863.23, 863.22
See application file for complete search history.

(56) References Cited

U.S. PATENT DOCUMENTS 3,978,397 A * 8/1976 Burry .................... G01N 27/68 324/469
4,380,720 A 4/1983 Fleck
4,769,609 A * 9/1988 Masuda ............ G01N 15/0266 324/455
4,976,752 A * 12/1990 Torok ....................... B03C 3/38 361/230
6,514,721 B2 * 2/2003 Spurrell .............. G01N 1/2205 435/287.5
6,898,990 B2 * 5/2005 Rogers ................ G01N 1/2208 73/864.25
6,964,189 B2 * 11/2005 Carlson .................... B03C 3/08 73/28.02
7,235,120 B2 * 6/2007 Dennis ...................... B03C 3/32 95/2
7,364,553 B2 * 4/2008 Paz ....................... A61B 5/087 600/529
7,428,848 B2 * 9/2008 Pant .................... G01N 1/2202 250/288
8,104,362 B2 * 1/2012 McFarland ........... B01D 46/06 209/142
8,167,986 B2 * 5/2012 Schneider .............. B03C 3/383 95/78
8,186,235 B2 * 5/2012 Mainelis ............. G01N 1/2202 73/864.71
8,398,746 B2 * 3/2013 Black .................. G01N 1/2202 95/78
8,607,616 B2 * 12/2013 Marra ....................... B03C 3/38 73/28.02
8,689,648 B1 * 4/2014 Heff .................... G01N 1/2273 73/863.22
8,721,767 B2 * 5/2014 Mainelis .................. B03C 3/09 95/79
8,813,583 B2 * 8/2014 Kilps .................. G01N 1/2205 73/863.22
8,991,271 B2 * 3/2015 Uang .................. G01N 1/2202 73/863.22
9,250,162 B2 * 2/2016 Braden ................ G01N 1/2208
9,333,512 B2 * 5/2016 Mainelis .................. B03C 3/47
9,433,883 B2 * 9/2016 Takenaka ............ G01N 1/2273
9,506,843 B2 * 11/2016 Peters ................. G01N 1/2208
9,606,038 B2 * 3/2017 Okuda .................. G01N 27/62
9,618,439 B2 * 4/2017 Volckens ............ G01N 1/2202
9,631,222 B2 * 4/2017 Ketcham ............. G01N 1/2205
9,656,223 B2 * 5/2017 Mochizuki ................ B01F 5/12
9,791,360 B2 * 10/2017 Niemela .................. G01N 5/00
10,371,616 B2 * 8/2019 Park ........................ C12Q 1/24
2001/0011473 A1 8/2001 Marshall et al.
2004/0025497 A1 2/2004 Truce
2004/0089156 A1 5/2004 Gartstein et al.
2004/0216612 A1 11/2004 Dennis
2005/0193803 A1 9/2005 Carlson et al.
2009/0040505 A1 2/2009 Ackerman et al.
2010/0001184 A1 1/2010 Chen et al.
2011/0216317 A1 9/2011 Marra
2011/0314900 A1 12/2011 Blacklin et al.
2012/0048748 A1 * 3/2012 Wickersham, Jr. .......................... G01N 15/0656 205/789
2012/0247232 A1 10/2012 Mainelis
2014/0241960 A1 8/2014 Mochizuki
2018/0193848 A1 * 7/2018 John ....................... B03C 3/361

* cited by examiner

FIGS. 4A-D

PERSONAL ELECTROSTATIC BIOAEROSOL SAMPLER WITH HIGH SAMPLING FLOW RATE

CROSS-REFERENCE TO RELATED APPLICATIONS

This application claims the benefit of U.S. Provisional Application No. 62/215,345, filed Sep. 8, 2015, the contents of which are incorporated herein by reference.

STATEMENT OF GOVERNMENT LICENSE RIGHTS

The present disclosure was made with government support. The United States government may have certain rights in this invention.

TECHNICAL FIELD

The present disclosure relates to the field of air quality monitoring devices, and more particularly, to personal samplers (collectors) to collect various airborne particles, including airborne particles of biological origin, i.e. bioaerosols (viruses, bacteria, fungi, pollen, etc.).

BACKGROUND

Bioaerosol samplers are air quality monitoring devices that may be used to collect particles from the air, including bioaerosols, such as viruses, bacteria, mold spores, pollen and their agglomerates and aggregates of biological particles and other particulate matter. Exposure to airborne biological agents, especially to pathogenic or allergenic microorganisms, may cause a wide range of respiratory and other health disorders in occupational and general populations costing billions of dollars in medical care and loss of income. Various illnesses and infections due to bioaerosol exposures have been reported in numerous industries and occupational and residential indoor air environments.

A number of stationary and portable bioaerosol samplers have been developed and used to assess exposures to bioaerosols. Several existing personal samplers were adapted for bioaerosol sampling needs, such as Button Aerosol Sampler or IOM cassette used with regular or gelatin filters. The use of size-selective polyurethane foams has been explored to sample thoracic and respirable bioaerosol fractions. Several new personal bioaerosol sampler concepts, such as using submerged porous medium, rotating cup and microcentrifuge-tube have been proposed.

These and other samplers represent advancement in the field of personal bioaerosol sampling, but a number of issues remain: the need for a separate and cumbersome sampling pump, high power consumption, inability to operate for extended periods of time (in most cases) and low sampling flow rates. Filter samplers can operate for several hours but only at low flow rates and require external pumps. Plus, sample extraction from filters inevitably leads to losses and reduced accuracy of exposure assessment, while liquid samplers have been shown to have high latent internal losses.

Despite the availability of existing stationary and portable bioaerosol samplers, advances in personal sampling of bioaerosols are needed, including improved sensitivity and elimination of cumbersome external sampling pumps. Further, a need exists for the ability to measure personal exposures to airborne microorganisms, especially at their low concentrations, thus improving the ability to identify the exposure risks and protect affected populations. It would thus be desirable to have a PEBS for collecting bioaerosols at high sampling flow rates for extended periods of time and a method for using same, which avoid the disadvantages of the known apparatus and methods.

SUMMARY

In a first aspect, there is provided herein a personal electrostatic bioaerosol sampler for collecting bioaerosols at high sampling flow rates for extended periods of time. The sampler includes a base holder, a charging section and a collection section. The base holder is of variable size having a longitudinal body with a first end, a second end, and a middle section disposed therebetween. The charging section is of variable size having a body, a first end, a second end, a center, an inlet, a first member, and a second member. The first member is disposed inside the center of the charging section and is configured to be connected to positive or negative high voltage. The second member is disposed therearound a midpoint of the first member inside the charging section and is configured to be grounded such that a plurality of ions are produced for charging a plurality of incoming particles. The collection section is of variable size having a body, a first end, a second end, an outlet, an outer surface, and a collection plate. The collection plate is releasably secured inside the collection section such that when the outer surface of the collection section is grounded and negative or positive high voltage is connected to the collection plate, a plurality of charged incoming particles are deposited onto the collection plate by an electrostatic field. The middle section of the base holder is configured to partly receive the charging section and the collection section therein the longitudinal body via an opening therethrough such that the second end of the charging section is secured to a first side of the longitudinal body and the second end of the collection section is secured to a second side of the longitudinal body when the sampler is in an assembled configuration.

In certain embodiments, the sampler further includes: a static air blender positioned upstream of the charging section at the inlet configured to improve mixing of the plurality of incoming particles and the plurality of produced ions; an inlet screen secured to a top side of the static air blender configured for receiving the plurality of incoming particles therethrough; and a fan positioned downstream of the collection section at the outlet in which the fan has a protective grill disposed thereon.

In certain embodiments, the high voltage is supplied by a battery via a DC-to-DC converter such that the battery and the converter are positioned on each side of the base holder.

In certain embodiments, the first member is tungsten wire and the second member is a ring of stainless steel wire.

In certain embodiments, the tungsten wire is supported by a pair of insulating posts such that one post is disposed on a first end of the tungsten wire and another post is disposed on a second end of the tungsten wire.

In certain embodiments, the tungsten wire is used as a source of ions with a low operating high voltage in a range of from 5 to 8 kV.

In certain embodiments, the collection plate is fabricated of a conductive material such as stainless steel and the like.

In certain embodiments, the collection plate is coated with a superhydrophobic material.

In certain embodiments, the collection section includes two half-cylinder collection chambers divided by the collection plate for allowing sequential collection of at least two samples from each surface of the collection plate.

In certain embodiments, each half-cylinder collection chamber has a round top quarter-cylinder section in which a ground electrode is slidably inserted through a groove in a middle of the collection chamber.

In certain embodiments, the sampler is fabricated of a non-static material.

In certain embodiments, the sampler is manufactured by machining and 3D-printing.

In certain embodiments, the sampler is configured to be smaller than about five inches in length and weigh less than about eight ounces.

In a second aspect, there is provided herein a personal electrostatic bioaerosol sampler for collecting bioaerosols at high sampling flow rates for extended periods of time. The sampler includes a charging section, a collection section and a connector section. The charging section is of variable size having a body, a first end, a second end, a center, an inlet, a first member, and a second member. The first member is disposed inside the center of the charging section and is configured to be connected to high voltage. The second member is disposed therearound a midpoint of the first member inside the charging section and is configured to be grounded such that a plurality of ions are produced for charging a plurality of incoming particles. The collection section is of variable size having a body, a first end, a second end, an outlet, an outer surface, and a collection plate. The collection plate is releasably secured inside the collection section such that when the outer surface of the collection section is grounded and high voltage is connected to the collection plate, a plurality of charged incoming particles are deposited onto the collection plate by an electrostatic field. The connector section is of variable size having a body, a first end, and a second end. The connector section is configured to secure the charging section and the collection section to the body of the connector such that the second end of the charging section is secured to a first end of the connector and the second end of the collection section is secured to the second end of the connector when the sampler is in an assembled configuration.

In certain embodiments, the first member is tungsten wire and the second member is a ring of stainless steel wire.

In a third aspect, there is provided herein a particle charger for efficiently charging particles with low ozone production. The particle charger includes a first member disposed inside the center of the charging section of the sampler disclosed herein. The first member is configured to be connected to high voltage. The second member is disposed therearound a midpoint of the first member inside the charging section and is configured to be grounded such that a plurality of ions are produced for charging a plurality of incoming particles therethrough the sampler.

In certain embodiments, the first member is tungsten wire and the second member is a ring of stainless steel wire.

In certain embodiments, the tungsten wire is supported by a pair of insulating posts such that one post is disposed on a first end of the tungsten wire and another post is disposed on a second end of the tungsten wire.

In certain embodiments, the pair of insulating posts are ceramic.

In certain embodiments, the tungsten wire is one inch in length and 0.003 inches in diameter and the ring of stainless steel wire is 0.015 inches in diameter.

In certain embodiments, the tungsten wire is used as a source of ions with a low operating high voltage in a range of from 5 to 8 kV.

In certain embodiments, the high voltage is supplied by a battery via a DC-to-DC converter.

In a fourth aspect, there is provided herein an air blender for improving the mixing of incoming particles with produced ions to enhance particle contact with ions and for improving particle charging. The air blender includes a body of variable geometric shape and size having an inner body and an outer body. A plurality of blades are disposed in the inner body and the outer body.

In certain embodiments, the body, inner body and outer body are circular.

In certain embodiments, the inner body has six blades and the outer body has fifteen blades.

In certain embodiments, the air blender is manufactured by 3D-printing.

In a fifth aspect, there is provided herein a method of using a personal electrostatic bioaerosol sampler for collecting a wide particle size range (from nano-sized viruses to pollen) at high sampling flow rates for extended periods of time. The method includes providing a sampler having a base holder, a charging section, and a collection section. A middle section of the base holder is configured to partly receive the charging section and the collection section therein via an opening therethrough such that the charging section is secured to a first side of the base holder and the collection section is secured to a second side of the base holder when the sampler is in an assembled configuration. The method further includes: drawing a plurality of incoming particles of variable sizes through an inlet of the charging section; producing a plurality of ions in the charging section such that a first member is disposed inside a center of the charging section and is configured to be connected to positive or negative high voltage and a second member is disposed therearound a midpoint of the first member inside the charging section and is configured to be grounded for charging the plurality of incoming particles; collecting the plurality of incoming particles in the collection section in which a collection plate is releasably secured inside the collection section such that when an outer surface of the collection section is grounded and negative or positive high voltage is connected to the collection plate, a plurality of charged incoming particles are deposited onto the collection plate by an electrostatic field; removing the collection plate from the collection section after sampling is completed; rinsing off the collected particles from the collection plate; and analyzing the collected particles from the sampler.

In certain embodiments, the first member is tungsten wire and the second member is a ring of stainless steel wire.

In certain embodiments, the step of producing a plurality of ions in the charging section includes the step of applying low operating high voltage in a range of from 5 to 8 kV for minimizing ozone production. Higher or lower voltages can also be applied.

In certain embodiments, the step of providing a sampler includes the step of adding a static air blender to improve mixing of the plurality of incoming particles and the plurality of produced ions in the charging section.

Various advantages of this disclosure will become apparent to those skilled in the art from the following detailed description, when read in light of the accompanying drawings.

DETAILED DESCRIPTION

Figures 1A, 1B:
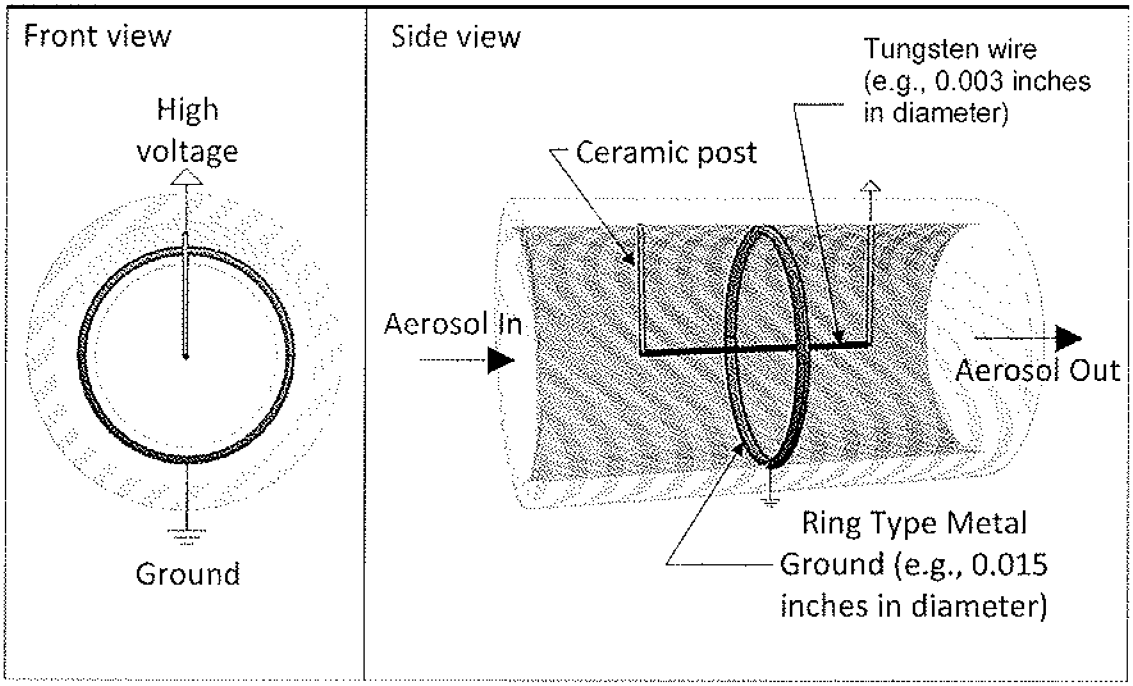
FIG. 1A is a cross-sectional view of the initial prototype (charger only) of the personal electrostatic bioaerosol sampler (PEBS), according to the present disclosure.
FIG. 1B is a schematic side view of the initial prototype (charger only) of the PEBS, according to the present disclosure.

This disclosure is not limited to the particular apparatus, systems, methodologies or protocols described, as these may vary. The terminology used in this description is for the purpose of describing the particular versions or embodiments only, and is not intended to limit the scope.

As used in this document, the singular forms "a," "an," and "the" include plural reference unless the context clearly dictates otherwise. Unless defined otherwise, all technical and scientific terms used herein have the same meanings as commonly understood by one of ordinary skill in the art. All publications mentioned in this document are incorporated by reference. All sizes recited in this document are by way of example only, and the disclosure is not limited to structures having the specific sizes or dimensions recited below. As used herein, the term "comprising" means "including, but not limited to."

In consideration of the figures, it is to be understood for purposes of clarity certain details of construction and/or operation are not provided in view of such details being conventional and well within the skill of the art upon disclosure of the document described herein.

The personal electrostatic bioaerosol sampler (PEBS) of the present disclosure pertains to a device for efficiently collecting bioaerosols at high sampling flow rates for extended periods of time that improves assessment of exposure to occupational agents and helps prevent and reduce work-related respiratory infectious diseases. The electrostatics-based personal sampler includes several design features: all-in-one type (i.e., charger, collector, fan, DC-to-DC converter, batteries, clip for attachment, and housing), small open channel device, and low-cost fabrication. In operation, the bioaerosol particles are drawn into the open channel, electrically charged using a tungsten wire ionizer and deposited onto a removable plate covered by a superhydrophobic (non-wettable) substance. When using an open channel device, a small fan-based air mover and electrostatic collection in the PEBS has been shown to be feasible to achieve high collection efficiencies and also maintain zero pressure drop. Once the sampling is complete, the plate can be removed and the collected particles rinsed off with a desired amount and type of liquid. The collected particles can be analyzed by various techniques, including microscopy, molecular tools, and the like.

The primary innovation of the PEBS is a combination of electrostatic collection method and removable superhydrophobic collection surface in an open channel collector. Due to low pressure drop of the open channel design and low electrical current requirement, power for both the air mover and the electrostatic collector can be provided by a built-in battery. Low power consumption and small size make this sampler easy to wear on a person and highly applicable for occupational and environment studies and field deployments. Its potential to sample for several hours allows for the determination of dose-response relationships due to exposure to bioaerosols. In addition, the ability to wash-off particles collected on the superhydrophobic surface ensures almost a lossless transfer of particles into liquid for their analysis by various methods, including molecular tools. Such design avoids potential losses associated with liquid and filter samplers thus ensuring a more accurate exposure assessment.

Use of innovative wire-to-wire design (FIGS. 1A-B) to electrically charge the incoming particles produces sufficient concentration of ions for effective particle charging while having low ozone production.

The PEBS is advantageous over existing technologies as follows: (1) High sampling flow rates allow detecting exposures to even low microorganism concentrations, a feature lacking in existing personal bioaerosol samplers, thus substantially improving the ability to identify the exposure risks and to protect affected populations; (2) The personal sampler is lightweight, battery-operated (no external pump needed), inexpensive, and capable of operating for extended periods of time (testing for up to eight hours); (3) Collection of biological particles into liquid conveniently allows sample analysis by multiple techniques, including molecular tools; and 4) Use of electrostatic technique allows collection of a wide range of particle sizes: from nano-sized viruses to micron sized bacteria and mold spores to even larger pollen and agglomerates/aggregates of the above particles attached to non-biological particles.

It is presently contemplated in accordance with the present disclosure that the PEBS can be adopted to collect nanoparticles in various air environments, such as indoors, occupational and others to accurately measure airborne nano-sized objects in those environments. Optimization of the PEBS for estimating personal exposures to nano-objects in various air environments involved in nanoparticle research, manufacturing and use is being investigated.

Figure 2:
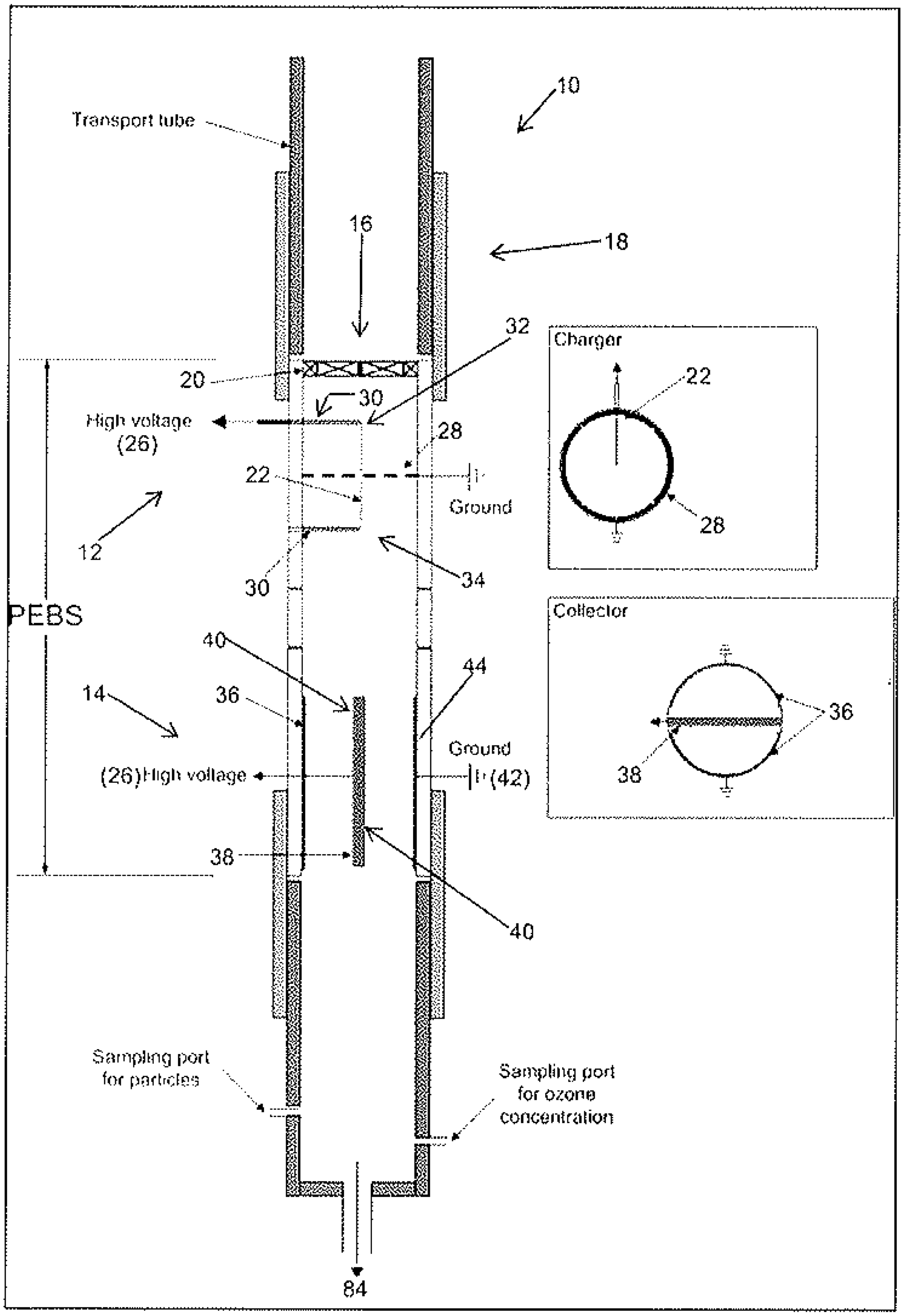
FIG. 2 is a cross-sectional view of an exemplary embodiment of the charger and collector of the PEBS, according to the present disclosure. The upper part is the charger as shown in FIGS. 1A-B and the lower part is the collector.
Figure 3:
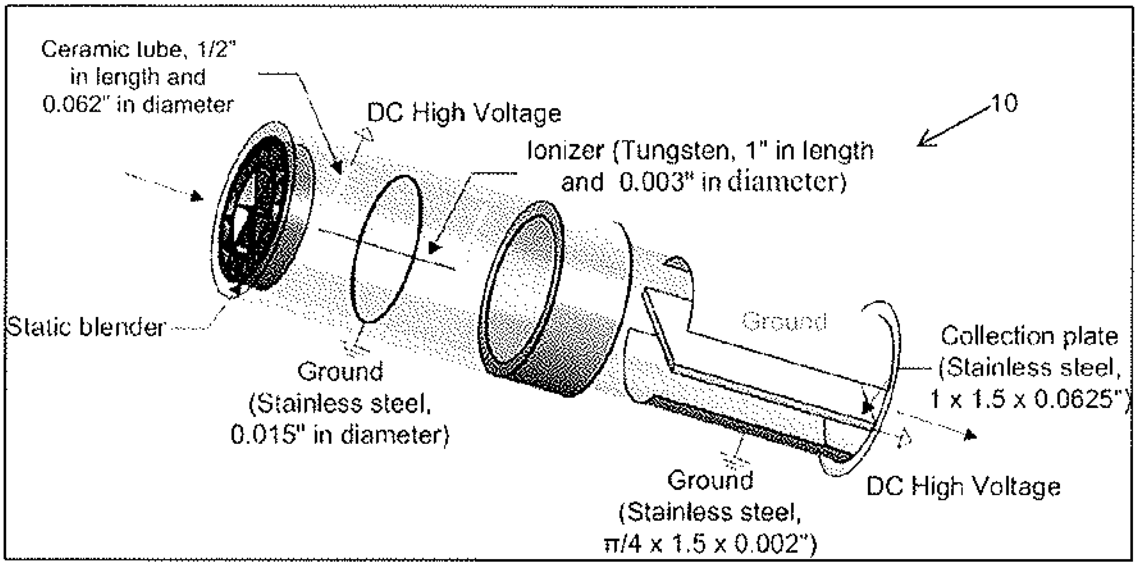
FIG. 3 is a schematic 3D rendering of the exemplary embodiment of the PEBS shown in FIG. 2, according to the present disclosure.

Referring now to FIG. 2, the PEBS 10 of the present disclosure is shown in vertical cross-section. FIG. 2 shows a detailed schematic view of the initial prototype used for actual experiments to optimize the charger 12 and collector 14. In operation of one embodiment of the PEBS, the particles are drawn through an inlet 16 and into a charging/collection cylinder 18 about 4.5 inches long and 1 inch in diameter. To improve mixing of the incoming aerosol particles with the produced ions a novel static air "blender" 20 is positioned at the sampler's inlet 16. The two sections (the charging section 12 and collection section 14) in the PEBS are connected. FIG. 3 is a schematic 3D rendering of an exemplary embodiment of the PEBS 10 (FIG. 2). For the charger 12, a novel wire-to-wire concept (FIG. 1) is applied. An inch long tungsten wire 22 is positioned at a distance of 0.5 inches downstream of the PEBS inlet 16 and in the center of the charging chamber 12 (i.e., 1 inch cylinder). The wire 22 is connected to high voltage 26; a ring of stainless steel wire 28 (0.015 inches in diameter) is installed on the inside of the cylinder 12 and surrounds the tungsten wire 22 at its midpoint; the ring 28 is grounded. The tungsten wire 22 is supported by a pair of small insulating posts 30 such that one post 30 is disposed on a first end 32 of the tungsten wire 22 and another post 30 is disposed on a second end 34 of the tungsten wire 22. In this embodiment, the posts 30 are ceramic. Since the tungsten wire 22 is connected to high voltage 26 and the thin stainless steel wire electrode 28 is grounded, this novel configuration creates sufficient amount of ions which charge the incoming particles. Due to this particular charger configuration, ozone production is low.

The collection section 14 consists of two half-cylinder collection chambers 36 divided by the thin metal collection plate 38 (length (l): 1.5 inches×width (w): 1 inch×height (h): 0.0625 inches), thus allowing sequential collection of two samples from each surface 40 of the collection plate 38. The round top quarter-cylinder section in each half cylinder 36 is a ground electrode 42 (length (l): 1.5 inches×circumference (c): 0.785 inches×height (h): 0.002 inches) inserted through a groove (not shown) in the middle of the chamber 36. When the outer surface 44 of the collection section 14 is grounded and high voltage 26 is connected to the collection plate 38 in the collection section 14, the charged incoming particles are deposited onto the collection plate 38 by an electrostatic field. If the positive voltage is applied, the incoming particles will be charged negatively. Once the sampling is completed, the collection plate 38 can be removed from the collection chamber 14. As the plate 38 is coated by a superhydrophobic substance, the collected particles can be easily washed off with 0.1-10 ml of liquid, such as water or phosphate buffer, and then analyzed.

As ozone production is a concern in electrostatic precipitators, the Food and Drug Administration (FDA) standard provides guidance in this area and limits ozone output of indoor medical devices to 0.05 ppm, which is stricter than the 0.10 ppm standard for eight hours set by the Occupational Safety and Health Administration (OSHA). In accordance with the present disclosure, a tungsten wire is used as a source of ions with a low operating high voltage (5-8 kV) to minimize ozone production. Further, with this material and condition ion release can be initiated at voltages below the full corona effect, which further minimizes ozone production. Other methods of particle charging, such as UV ionizers (UV diodes), may also be considered. The device is equipped with protective features to prevent the user from being exposed to high voltage when handling and/or opening the device.

To minimize ozone production by electrostatic collectors, one could use diffusion charging, where high voltage is connected to a thin wire or needle without having a ground voltage opposite to it. Preliminary results showed that this design results in very poor particle charging and collection efficiency. On the other hand, by separating the charger and collector into two separate components and redesigning the charger, one could have high collection efficiency with low ozone production. In the new charger 12 (FIG. 1), high voltage 26 is connected to a tungsten wire 22 (0.003 inches in diameter), as in a typical wire-to-plate design. Instead of a grounded plate, however, a ring of a grounded thicker wire 28 (e.g., 0.015 inches in diameter) is used. Preliminary experiments show that with this design (i.e., wire-to-wire), low voltage (e.g., 5-6.0 kV) at 10 L/min flow rates is needed to initiate the field charging and the ozone concentration is only about less than 10 ppb. Particle losses inside the charger were less than 20%. Furthermore, to improve mixing of particles and ions, a static air "blender" 20 upstream of the charger 12 can be added. The air "blender" 20 concept, a 3D-printed example, and CFD modeling of its effect on air velocities are presented in FIGS. 4A-D (an exemplary design of the PEBS for CFD simulation).

The main parameters determining the sampler's collection efficiency are its shape, sampling flow rate, particle sizes, and electrostatic field strength. In accordance with the present disclosure, computation fluid dynamics (CFD) simulation through the Fluent package (Ansys Inc., Canonsburg, Pa.) can be used to optimize the sampler's geometric and operational parameters. To solve electrostatic precipitation processes, including interactions between the flow field, particle charge, electrostatic fields, and particle trajectory, the EHD (Electro hydro dynamic) and Discrete Phase Module (DPM) modules can be used. The CFD simulations can be performed for different sampler geometries, sampling flow rates ranging (e.g., 10 to 30 L/min), high voltages ranging (e.g., 5 to 8 kV) and a wide range of particle sizes (e.g., 0.029 to 3.1 or even smaller/larger μm in diameter). The design goal of the PEBS of the present disclosure is an average collection fraction of >80%. At the target flow rates (10-30 L/min), the flow is confined to a laminar regime. The numerical simulations allow optimizing the PEBS's geometry and operating conditions before fabrication and experimental testing.

By using CFD simulation, extensive simulation of various PEBS design options to determine its best-performing configuration can be conducted. One of the tasks was to determine location of the discharge electrode (charger of incoming particles) relative to the grounded collection electrode that would yield best performance of the sampler. To calculate the flow field, electrohydrodynamic (EHD) and discrete phase model (DPM) two-dimensional models can be used to save iteration time.

The investigated 2D model had a length of 2.41 inches and a height of 1.0 inch and a single discharge electrode (DE) mounted 0.375 inches away from the bottom collecting plate, which was 1.75 inches long. The geometry and mesh generation software "Gambit" was used as a preprocessor to create the calculation geometry, discretize the fluid domain into small cells to form a surface, and set up the boundary conditions. Calculations for the electrode's offset from the front of the collecting plate by 0, 0.25, 0.5, 0.75 inches were performed and it was found that the particle collection efficiency increased with increasing offset: collection efficiency at the offset of 0.75 inches was 29% higher than the collection efficiency with no offset. A dual configuration of the PEBS was considered: two discharge electrodes facing dual-sides collection electrode. Here, the performance of the sampler improved by about 71% compared to the initial sampler model.

Figure 11A:
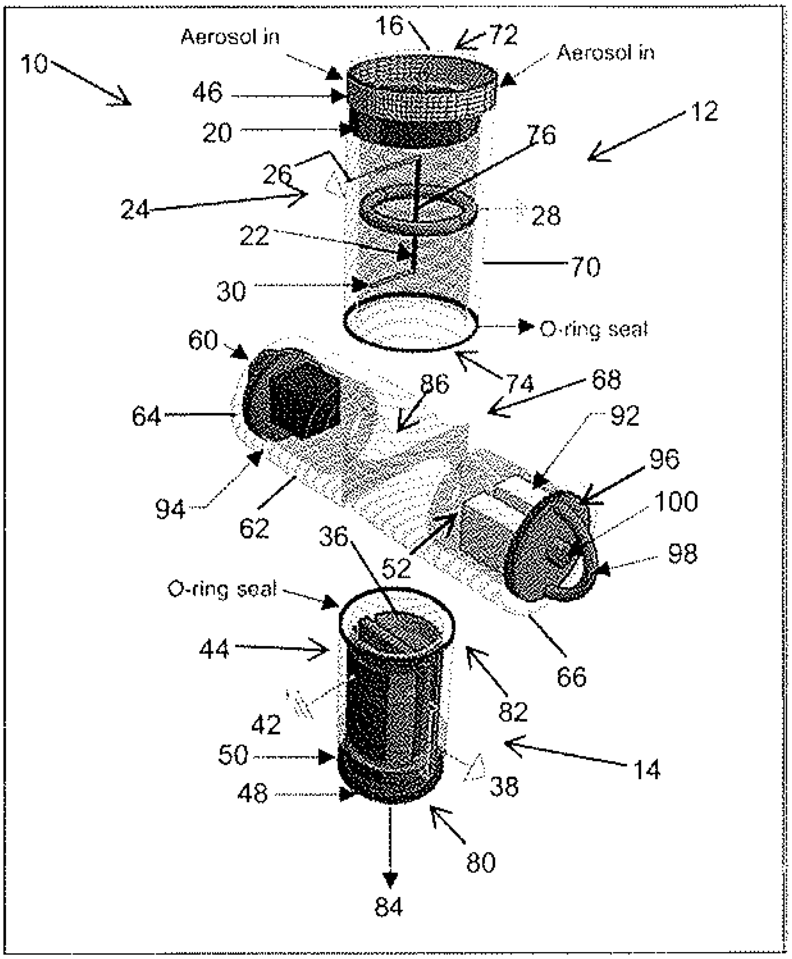
FIG. 11A is an exemplary embodiment of the field deployable PEBS shown in 3D view, according to the present disclosure.

Once the sampler's geometry and operating parameters have been optimized, the PEBS can be manufactured using machining and 3D printing technology. The sampler's body is designed to easily incorporate the remaining components, namely, the inlet screen 46, protective grill 48, stainless steel collection plate 38, fan 50, and battery compartments 52 (FIG. 11A). Using the data above, a 3D numerical model of the sampler was built. To improve mixing of the incoming aerosol particles with the produced ions an air blender 20, which is positioned at the sampler's inlet 16, was designed. The mixing of the fluid downstream of the air blender 20 can be quantified using coefficients of variation (COV) of the velocity profiles. The air flow in this model was simulated by using tetrahedral and hexahedral computational meshes consisting of 3,700,000 cells. The use of the air blender yielded air flow COVs of about 40% all the way downstream from the "blender", a substantial improvement in the sampler's performance.

Figure 4:
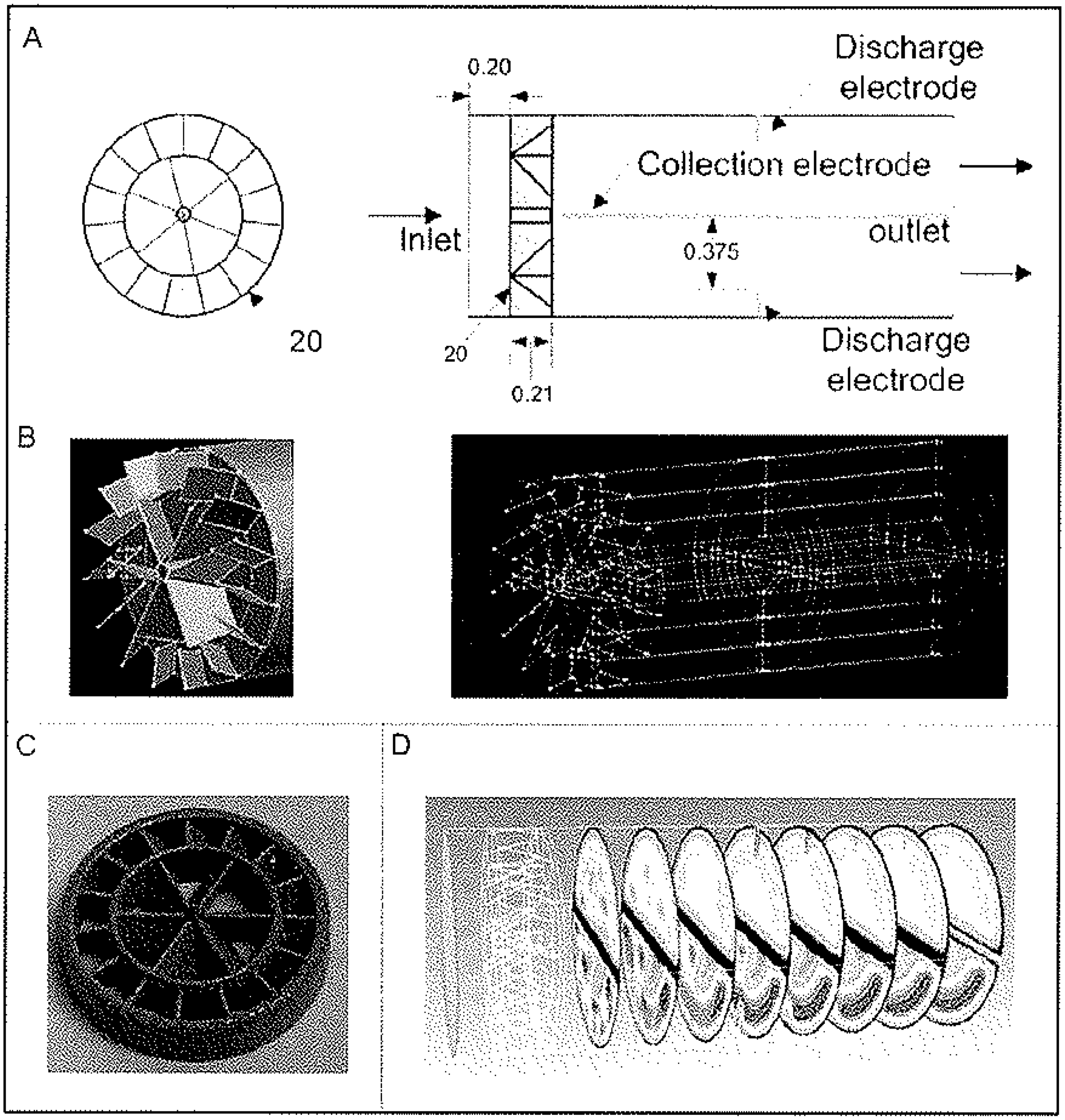
FIG. 4A is a schematic side view of the exemplary configuration of the PEBS for computational fluid dynamics (CFD) simulations, according to the present disclosure.
FIG. 4B is a 3D rendering of a static air blender of the PEBS inlet and 3D wireframe for CFD calculations, according to the present disclosure.
FIG. 4C is a top perspective view of a 3D-printed air blender of the PEBS, according to the present disclosure.
FIG. 4D is air velocity magnitude contours at different cross-sections within the PEBS, according to the present disclosure.

Based on the 2D and 3D CFD simulations, a PEBS prototype was built using a combination of machining and 3D printing. The 1-inch air blender 20 was 3D printed and has six blades in the inner circle and fifteen blades in the outer circle (see FIGS. 4A and 4C). The prototype PEBS was constructed from non-static material (e.g., Delrin) and assembled with the blender 20, ionizer 22 and a stainless steel collection plate 38. FIG. 4 shows 3D geometry of an exemplary configuration of the PEBS prototype for CFD simulation, computational mesh, the novel air blender 20 and air streamlines inside the sampler 10. The next step was laboratory investigation of PEBS with non-biological test particles as described below. Sampler collection efficiencies ranging from 60 to 90% were observed when sampling 1 μm particles over a range of operational voltages and sampling flowrates.

Laboratory Evaluation of PEBS when Collecting Non-Biological Particles

Figure 5:
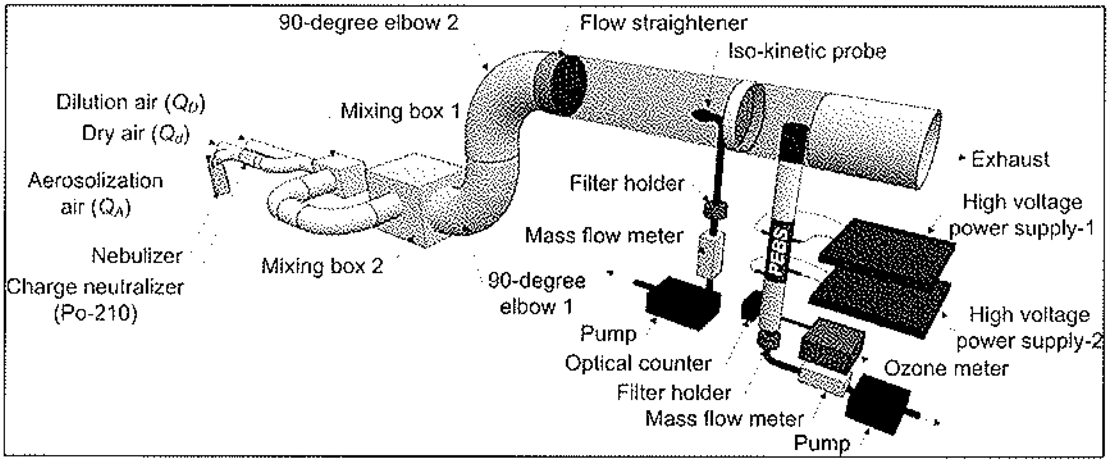
FIG. 5 is a perspective view of an exemplary experimental setup for testing the charger and collector of the PEBS as shown in FIG. 2, according to the present disclosure.

The collection fraction ($C_E$) of the PEBS can be determined using monodisperse polystyrene latex (PSL) particles of typical microorganism sizes (0.029, 0.1, 0.2, 0.5, 1, and 3.1 μm in aerodynamic diameter) and the experimental setup shown in FIG. 5. Briefly, test particles are aerosolized (air flow $Q_A$), dried ($Q_d$) and diluted ($Q_D$), charge-neutralized (Po-210) and conveyed into a test chamber. The final relative humidity in the test chamber is about 30-40%. The PEBS draws test particles from the chamber at a flow rate $Q_S$. The entire experiment may be carried out inside a Class II Biosafety cabinet (Nuaire Inc., Plymouth, Minn.) and ozone levels are monitored (2B Technologies, Boulder, Colo.).

Figure 6:
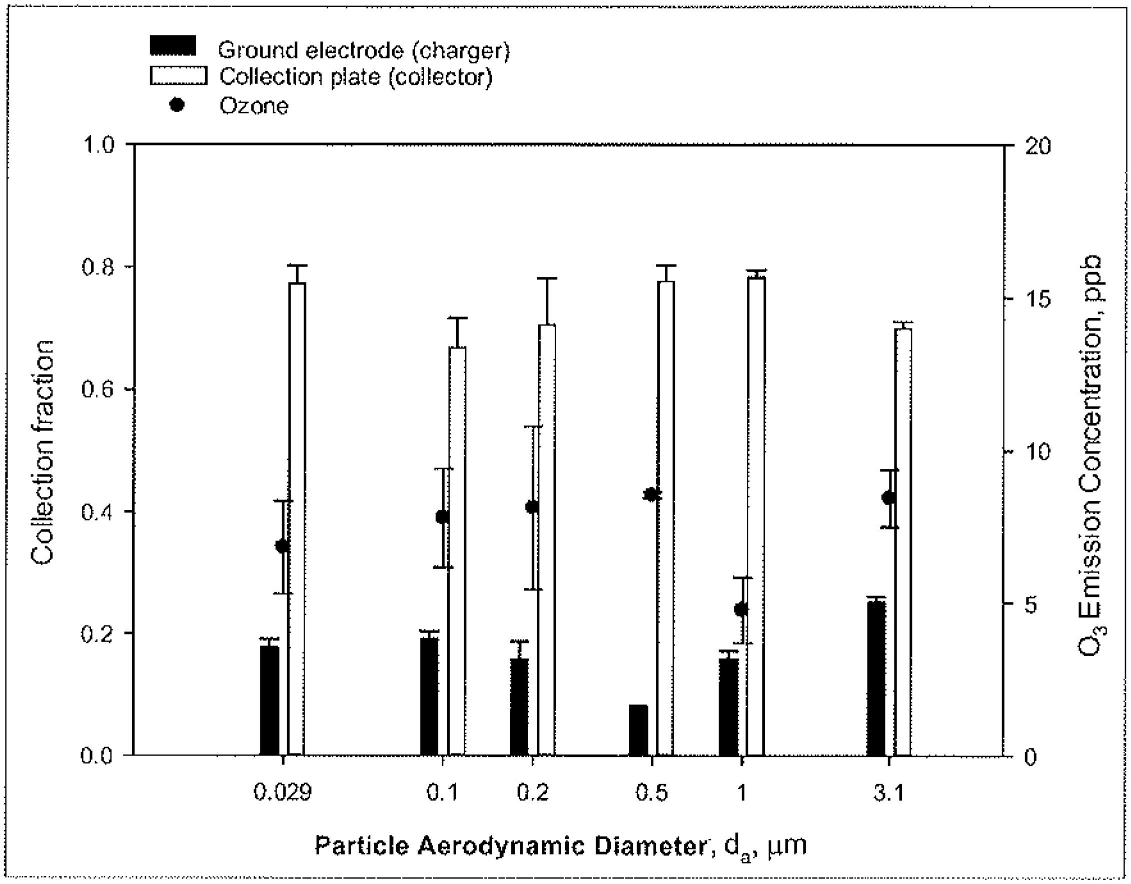
FIG. 6 is a bar graph illustrating the collection fraction and average ozone production by the PEBS as a function of particle size, according to the present disclosure

In the first testing phase (with non-biological particles), the $C_E$ of PEBS was measured by counting particles leaving the sampler (charger or collector separately to determine particle capture fraction of each component) with its voltage ON and OFF using an optical particle counter (model 1.108, Grimm Technologies Inc., Douglasville, Ga.). In this phase, the charging/collection voltage and air flow are provided by external sources. Particle bounce from the collection plate is expected to be minimal, since the deposition velocity due to electrostatic forces is much lower than in inertia-based methods. The operational parameters were optimized based on results from this Phase. If several conditions yield average collection fraction about 80%, parameters in this order of priority was chosen: low ozone production and lower charging/collection high voltage. If average $C_E$ was about 80% across the tested particle sizes (0.029-3.1 μm), we proceeded to the next stage of experiments (with biological particles). Otherwise, the collection fraction can be investigated as a function of voltage (5-8 kV), sampling time (10-240 min), and flow rates (10-30 L/min). Experiments were performed with all particle sizes and repeated three times. With this optimized PEBS design (FIG. 3), the device 10 was challenged with a wide range of particle sizes (0.029, 0.1, 0.2, 0.5, 1.0 and 3.1 μm in aerodynamic diameter) in FIG. 6. The average overall collection fraction in the collection plate was 73.4±4.9% over the wide range of test particles (0.029-3.1 μm) and the average ozone emission concentration was 7.4±1.4 ppb.

In the next experiment, the actual collection fraction of PEBS was determined by fluorometry. The concentration of fluorescent PSL particles collected by PEBS and washed-off into 5 mL ethyl acetate were compared to particle concentration (simultaneously collected on a reference filter (Type A/E, Pall Inc., East Hills, N.Y.) using an isokinetic probe (FIG. 5) and a method described elsewhere. Experiments were performed with 1 μm PSL particles, and sampling times of 10, 60, and 240 min to analyze performance in conditions ranging from grab sampling to a half work shift. The sampling flow rate (10 L/min) and charging/collection voltages (+5.5/−7 kV) were the same as determined above. The sampler's actual collection fraction was determined by measuring the amount of particles deposited on the collection plate relative to the particle concentration upstream of the sampler. For all three sampling times, the average overall actual collection fraction was about 77% and the average ozone emission concentration was 8.6±0.6 ppb. When the sampling time increased from 10 to 240 minutes the actual collection fraction decreased by approximately 10%. However, the actual collection fraction was not statistically significantly affected by sampling time ($P>0.05$). The use of the unique wire-to-wire charger resulted in ozone production below 10 ppb. Therefore, this new charging concept will allow maintaining desirable physiological characteristics of collected bioaerosols during a long-term sampling process, leading to a more accurate sample analysis.

Figure 8:
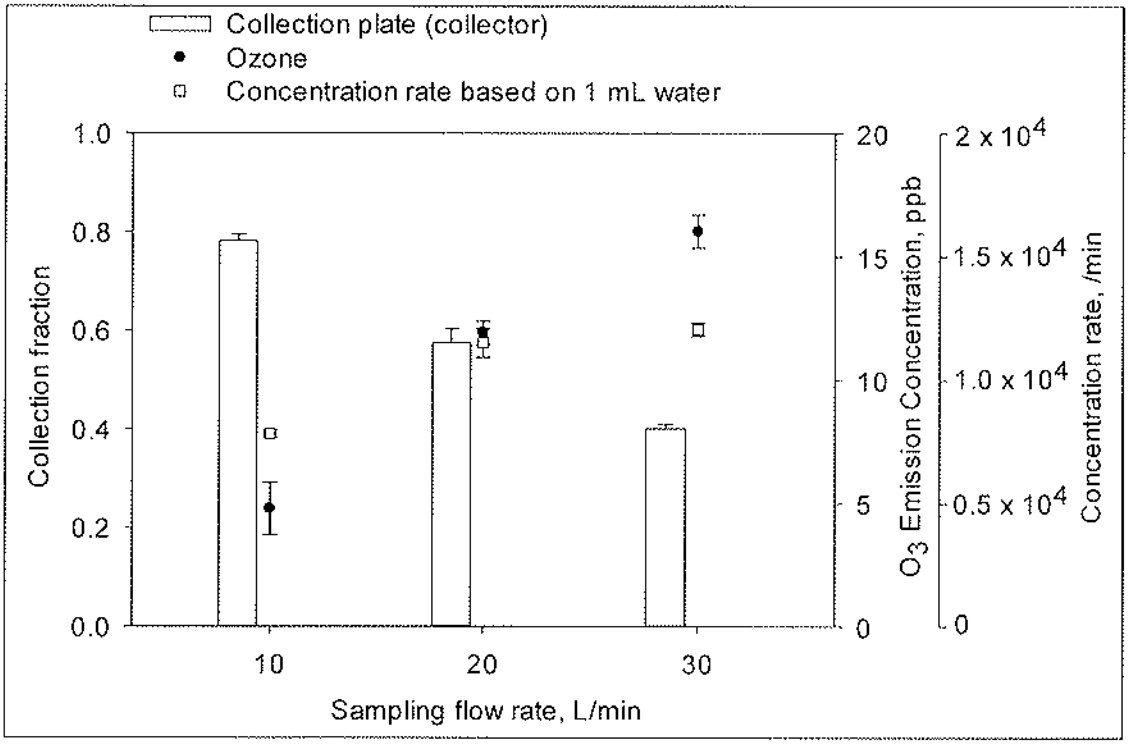
FIG. 8 is a bar graph illustrating the collection fraction, average ozone production, and the concentration rate by the PEBS as a function of sampling flow rate, according to the present disclosure.

For the next important parameter for evaluating the PEBS, three different sampling flow rates (10-30 L/min) were applied at each preferred charging voltage: +5.5 kV (10 L/min), +6.5 kV (20 L/min), and +7.5 kV (30 L/min). However, the collection voltage was fixed at −7 kV over all three sampling flow rates (10, 20, and 30 L/min). As both the sampling flow rate and the charging voltage increased, the ozone emission concentration increased from approximately 4.8 ppb at +5.5 kV and 10 L/min, to 11.9 ppb at +6.5 kV and 20 L/min, and then to 16.0 ppb at +7.5 kV and 30 L/min (FIG. 8). The collection fraction decreased with increasing a sampling flow rate: 78.3±1.3% at 10 L/min, 57.6±3.0% at 20 L/min, and 40.2±0.9% at 30 L/min. As could be expected, the collection fraction decreased with increasing sampling flow rate, since particles remained for shorter time periods in the collection chamber.

Figure 7:
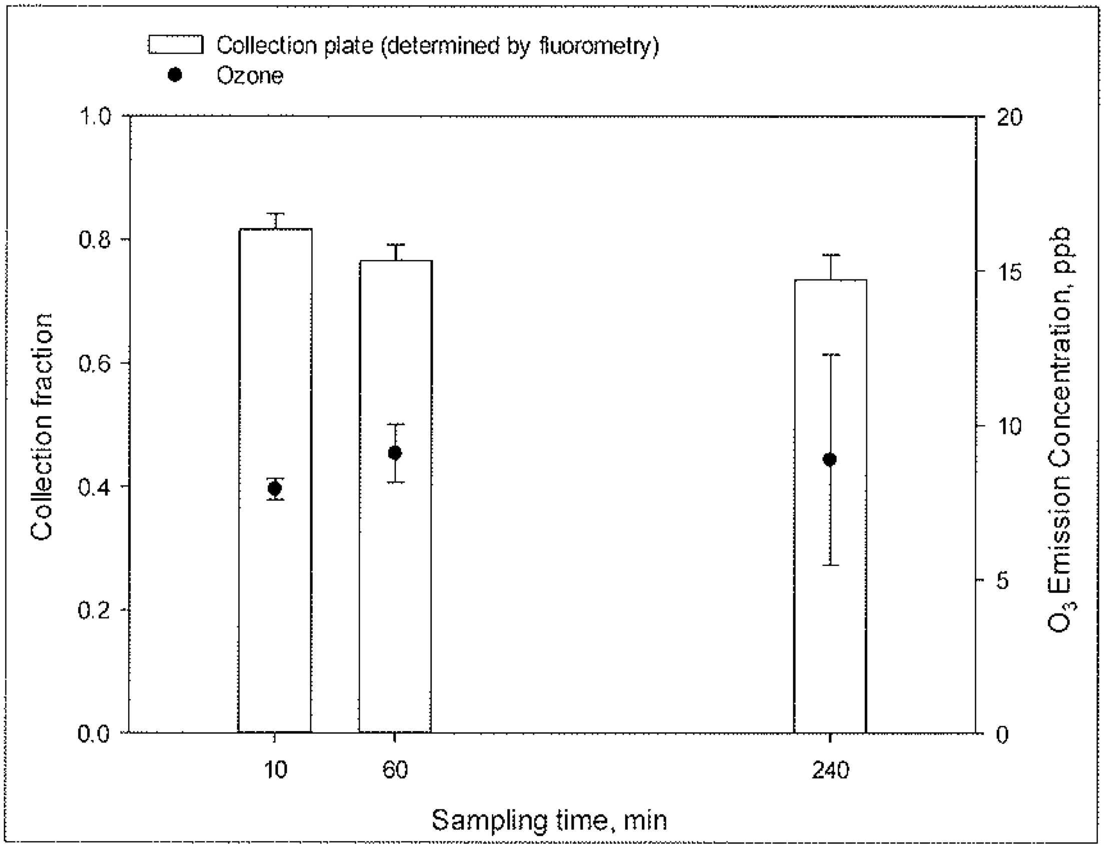
FIG. 7 is a bar graph illustrating the collection fraction and average ozone production by the PEBS as a function of sampling time, according to the present disclosure.

FIG. 7 shows the collection fraction and average ozone production by the PEBS as a function of sampling time, according to the present disclosure.

FIG. 8 also shows sampler concentration rates, based on the presented collection fraction data, the 1 mL volume of the collection water, 10 min sampling time and sampling flow rates of 10-30 L/min. Depending on the sampling flow rate, the concentration rates ranged from $7.8\times10^3$/min to $1.2\times10^4$/min for 1 μm PSL particles. When the available volume of collection water decreases to 0.1 mL, the concentration rate increases by a factor of 10 compared to 1 mL and the concentration rate exceeds $10^5$/min at even short sampling times (e.g., 10 min).

Laboratory Evaluation of PEBS when Collecting Bacteria

The sampler's operating parameters are transferred from the above relating to the Laboratory Evaluation of PEBS when collecting non-biological particles. Bacteria species commonly found in air environments are used: hardy bacteria *Bacillus atrophaeus* (formerly *Bacillus subtilis*) and sensitive *Pseudomonas fluorescens*. The investigators have successfully worked with these organisms in earlier studies. The cultures can be obtained from the American Type Culture Collection (Rockville, Md.).

Figure 9:
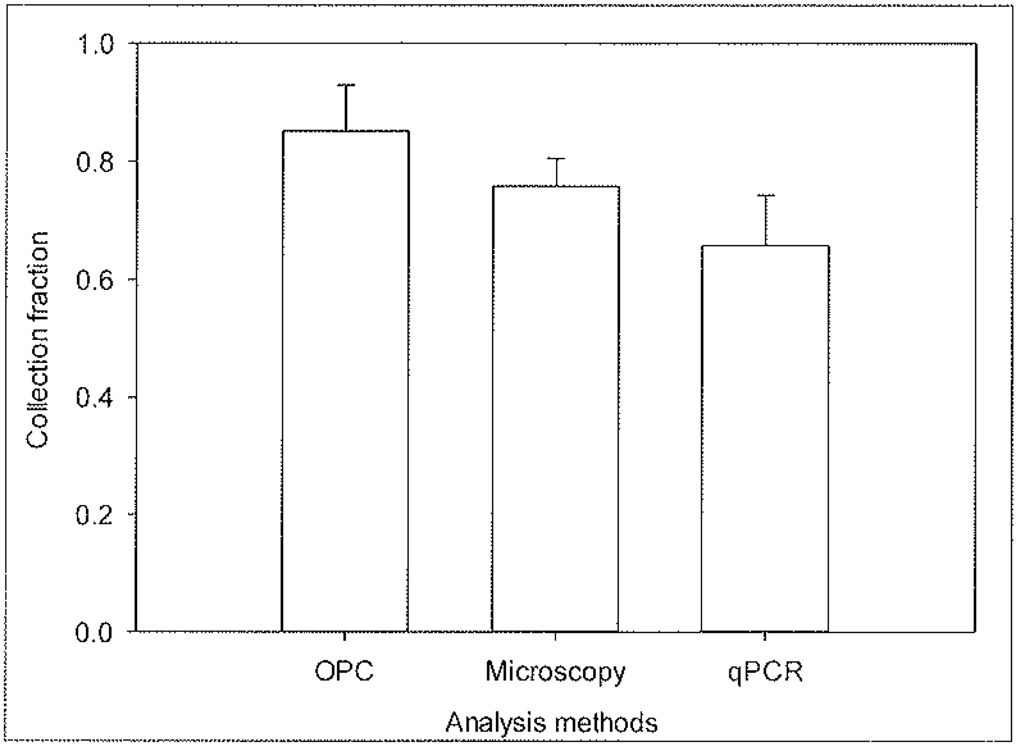
FIG. 9 is a bar graph illustrating the actual collection fraction of the PEBS when collecting *P. fluorescens* bacteria at a sampling flow rate of 10 L/min, according to the present disclosure. The collected bacteria were analyzed using different methods: OPC—optical particle counter, Microscopy, and qPCR—quantitative polymerase chain reaction.
Figure 10:
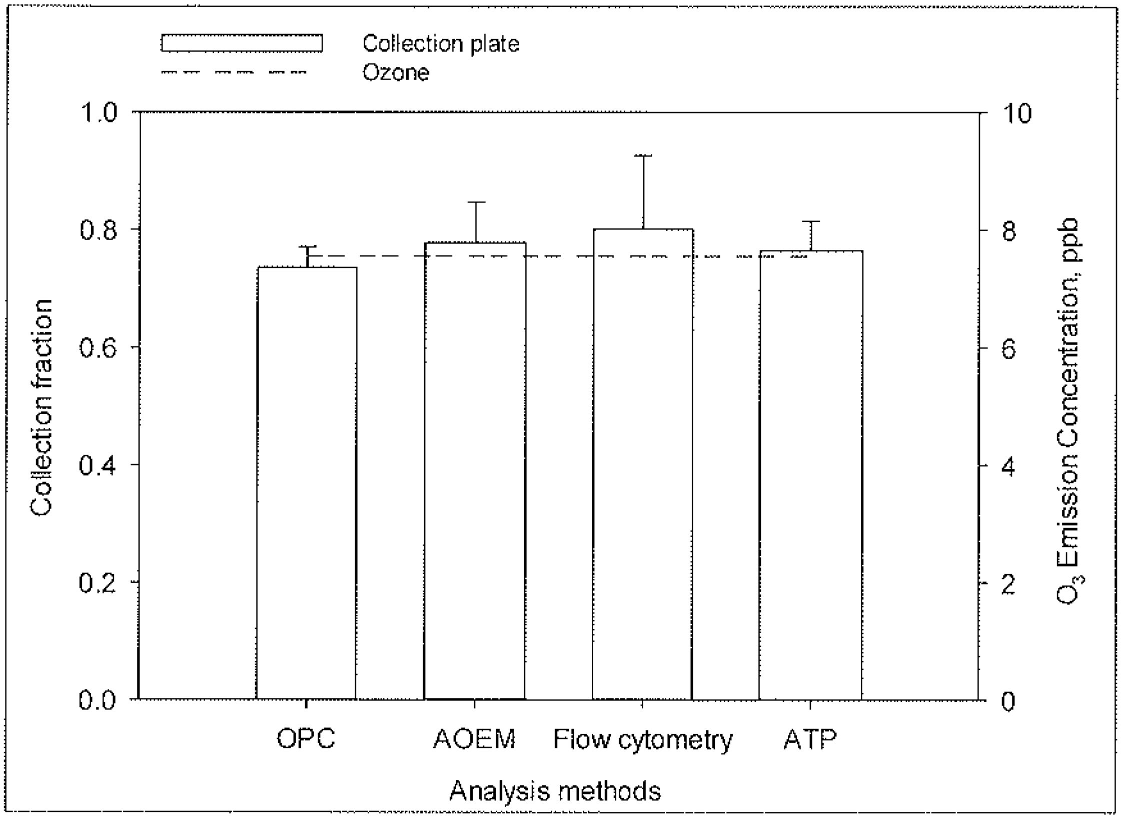
FIG. 10 is a bar graph illustrating the actual collection fraction and ozone emission concentration of the PEBS when collecting *B. atrophaeus* bacteria at a sampling flow rate of 10 L/min, according to the present disclosure. The collected bacteria were analyzed using different methods: OPC—optical particle counter, AOEM—acridine orange epifluorescence microscopy, flow cytometry, and ATP—adenosine triphosphate bioluminescence.

The sampler's physical and biological performances can be determined using various analysis methods: optical counter, acridine orange epifluorescence microscopy (AOEM), adenosine triphosphate (ATP) based bioluminescence, flow cytometry, quantitative real-time polymerase chain reaction (qPCR), and culture-based technique methods. The investigators have successfully adapted and used these methods to test bioaerosols. The sampler's collection fraction and ozone concentration were determined by measuring the amount of microorganisms deposited and washed-off from the collection plate by 5 or 10 ml of sterile deionized water and comparing it to the reference concentration collected on a filter using an isokinetic probe (FIG. 5). When the optimized PEBS version was used as described above, and then used to collect sensitive *P. fluorescens* bacteria, 70-80% of bacteria were recovered by qPCR and other detection methods (FIG. 9). Thus, the charger concept presented here has a great potential to efficiently charge the bioaerosol particles while inducing minimal damage to microorganism DNA integrity. For another experiments hardy bacteria *Bacillus atrophaeus* was used at sampling times of 10 min and flow rates of 10 L/min. For multiple analysis methods (OPC, AOEM, Flow cytometry, and ATP), airborne microorganism concentrations ~$10^7$/m$^3$ were used. The average collection fraction was about 77% and the ozone emission concentration was about 7.6 ppb (FIG. 10). As a result, the actual collection fraction was not statistically significantly affected by an analysis method (P>0.05).

Figure 11B:
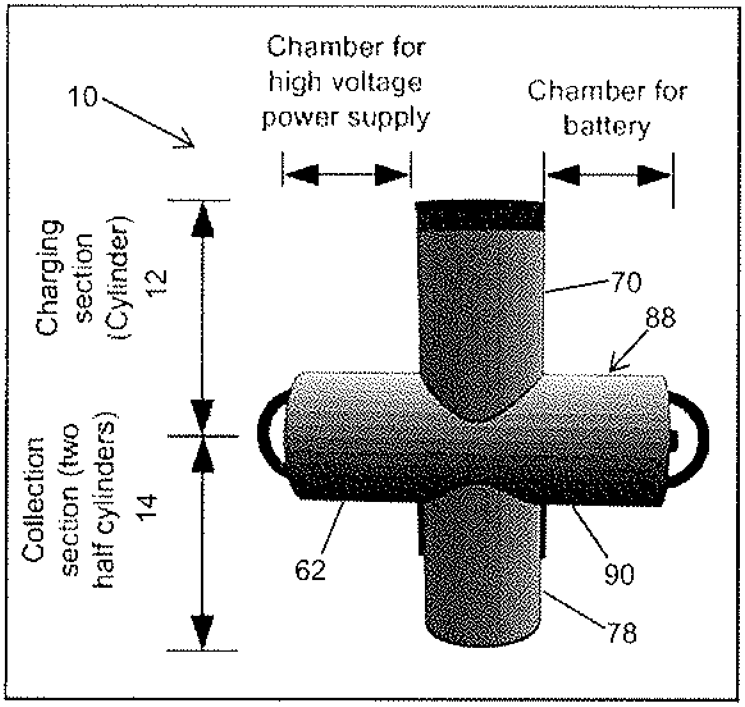
FIG. 11B is a schematic representation of the embodiment of FIG. 11A shown in an assembled configuration.

FIGS. 11A-B show a detailed schematic view and an assembled view of the field deployable PEBS 10, respectively. The vertical section is the embodiment previously described above for FIGS. 1-3 and the horizontal section (i.e., base holder) is the housing for batteries and electronics components. The sampler 10 includes a base holder 60, a charging section 12 and a collection section 14. The base holder 60 is of variable size and has a longitudinal body 62 with a first end 64, a second end 66, and a middle section 68 disposed therebetween. The charging section 12 is of variable size having a body 70, a first end 72, a second end 74, an inlet 16, a center 24, a first member (e.g., tungsten wire) 22, and a second member (e.g., a ring of stainless steel wire) 28. The first member 22 is disposed inside the center 24 of the charging section 12 and is configured to be connected to high voltage 26. The second member 28 is disposed therearound a midpoint 76 of the first member 22 inside the charging section 12 and is configured to be grounded such that a plurality of ions are produced for charging a plurality of incoming particles. The collection section 14 is of variable size having a body 78, a first end 80, a second end 82, an outlet 84, an outer surface 44, and a collection plate 38. The collection plate 38 is releasably secured inside the collection section 14 such that when the outer surface 44 of the collection section 14 is grounded and high voltage 26 is connected to the collection plate 38, a plurality of charged incoming particles are deposited onto the collection plate 38 by an electrostatic field. The middle section 68 of the base holder 60 is configured to partly receive the charging section 12 and the collection section 14 therein the longitudinal body 62 via an opening 86 therethrough such that the second end 74 of the charging section 12 is secured to a first side 88 of the longitudinal body 62 and the second end 82 of the collection section 14 is secured to a second side 90 of the longitudinal body 62 when the sampler 10 is in an assembled configuration.

Due to low power demand, the high voltage 26 can be supplied by a battery 92 through a DC-to-DC converter 94 (EMCO Corp., Sutter Creek, Calif.). Both batteries 92 and the converter 94 are configured to be positioned on each side of the base holder 60 in the PEBS 10 (FIGS. 11A-B), respectively. A lid 96 is disposed on the second end 66 of the longitudinal body 62 and is configured with a cap 98 and power button 100 for operating the sampler 10. The PEBS is configured to be smaller than about five inches in length and weigh less than about eight ounces. It should be understood that the PEBS can be configured of any suitable size and weight in accordance with the present disclosure. For convenience, the PEBS may be worn with the Industrial Hygiene Sampling Vest developed by Purdue University (West Lafayette, Ind.), or a similar arrangement.

Several of the features and functions disclosed above may be combined into different apparatus, systems or methods, or combinations of apparatus, systems and methods. Various presently unforeseen or unanticipated alternatives, modifications, variations or improvements therein may be subsequently made by those skilled in the art, each of which are also intended to be encompassed by the present disclosure and following claims.

What is claimed is:

1. A personal electrostatic bioaerosol sampler for collecting bioaerosols at high sampling flow rates for extended periods of time, the sampler comprising:

a base holder of variable size having a longitudinal body with a first end, a second end, and a middle section disposed therebetween;

a charging section of variable size having a body, a first end, a second end, a center, an inlet, a first member, and a second member, wherein the first member is tungsten wire and is disposed inside the center of the charging section and is configured to be connected to positive or negative high voltage and the second member is a ring of stainless steel wire and is disposed therearound a midpoint of the first member inside the charging section and is configured to be grounded such that a plurality of ions are produced for charging a plurality of incoming particles, wherein the tungsten wire is supported by a pair of insulating posts such that one post is disposed on a first end of the tungsten wire and another post is disposed on a second end of the tungsten wire;

a collection section of variable size having a body, a first end, a second end, an outlet, an outer surface, and a collection plate, wherein the collection plate is releasably secured inside the collection section such that when the outer surface of the collection section is grounded and negative or positive high voltage is connected to the collection plate, a plurality of charged incoming particles are deposited onto the collection plate by an electrostatic field;

wherein the middle section of the base holder is configured to partly receive the charging section and the collection section therein the longitudinal body via an opening therethrough such that the second end of the charging section is secured to a first side of the longitudinal body and the second end of the collection section is secured to a second side of the longitudinal body when the sampler is in an assembled configuration.

2. The sampler of claim 1 further comprising:

a static air blender positioned upstream of the charging section at the inlet configured to improve mixing of the plurality of incoming particles and the plurality of produced ions;

an inlet screen secured to a top side of the static air blender configured for receiving the plurality of incoming particles therethrough; and a fan positioned downstream of the collection section at the outlet, wherein the fan has a protective grill disposed thereon.

3. The sampler of claim 1, wherein the high voltage is supplied by a battery via a DC-to-DC converter such that the battery and the converter are positioned on each side of the base holder.

4. The sampler of claim 1, wherein the tungsten wire is used as a source of ions with a low operating high voltage in a range of from 5 to 8 kV.

5. The sampler of claim 1, wherein the collection plate is fabricated of a conductive material.

6. The sampler of claim 5, wherein the conductive material includes stainless steel.

7. The sampler of claim 1, wherein the collection plate is coated with a superhydrophobic material.

8. The sampler of claim 1, wherein the collection section includes two half-cylinder collection chambers divided by the collection plate for allowing sequential collection of at least two samples from each surface of the collection plate.

9. The sampler of claim 8, wherein each half-cylinder collection chamber has a round top quarter-cylinder section in which a ground electrode is slidably inserted through a groove in a middle of the collection chamber.

10. The sampler of claim 1, wherein the sampler is fabricated of a non-static material.

11. The sampler of claim 1, wherein the sampler is manufactured by machining and 3D-printing.

12. The sampler of claim 1, wherein the sampler is configured to be smaller than about five inches in length and weigh less than about eight ounces.

13. The sampler of claim 1, wherein the charging section is configured to efficiently charge particles while causing ozone production in concentrations of less than 10 ppb, and wherein the pair of insulating posts are ceramic.

14. The sampler of claim 1, further comprising:

an air blender for improving the mixing of incoming particles with produced ions to enhance particle contact with ions and for improving particle charging, the air blender comprising:

a body of variable geometric shape and size having an inner body and an outer body, wherein a plurality of blades are disposed in the inner body and the outer body.

15. The sampler of claim 14, wherein the air blender is positioned at the inlet of the charging station.

16. A personal electrostatic bioaerosol sampler for collecting bioaerosols at high sampling flow rates for extended periods of time, the sampler comprising:

a charging section of variable size having a body, a first end, a second end, a center, an inlet, a first member, and a second member, wherein the first member is tungsten wire and is disposed inside the center of the charging section and is configured to be connected to high voltage and the second member is a ring of stainless steel wire and is disposed therearound a midpoint of the first member inside the charging section and is configured to be grounded such that a plurality of ions are produced for charging a plurality of incoming particles, wherein the tungsten wire is supported by a pair of insulating posts such that one post is disposed on a first end of the tungsten wire and another post is disposed on a second end of the tungsten wire;

a collection section of variable size having a body, a first end, a second end, an outlet, an outer surface, and a collection plate, wherein the collection plate is releasably secured inside the collection section such that when the outer surface of the collection section is grounded and high voltage is connected to the collection plate, a plurality of charged incoming particles are deposited onto the collection plate by an electrostatic field; and a connector section of variable size having a body, a first end, and a second end, wherein the connector section is configured to secure the charging section and the collection section to the body of the connector such that the second end of the charging section is secured to a first end of the connector and the second end of the collection section is secured to the second end of the connector when the sampler is in an assembled configuration.

17. The sampler of claim 16, further comprising:

an air blender for improving the mixing of incoming particles with produced ions to enhance particle contact with ions and for improving particle charging, the air blender comprising:

a body of variable geometric shape and size having an inner body and an outer body, wherein a plurality of blades are disposed in the inner body and the outer body.

* * * * *